Dec. 24, 1957     H. A. LILJENBERG     2,817,457
SEED AND FERTILIZER SPREADER
Filed Jan. 3, 1956     2 Sheets-Sheet 1
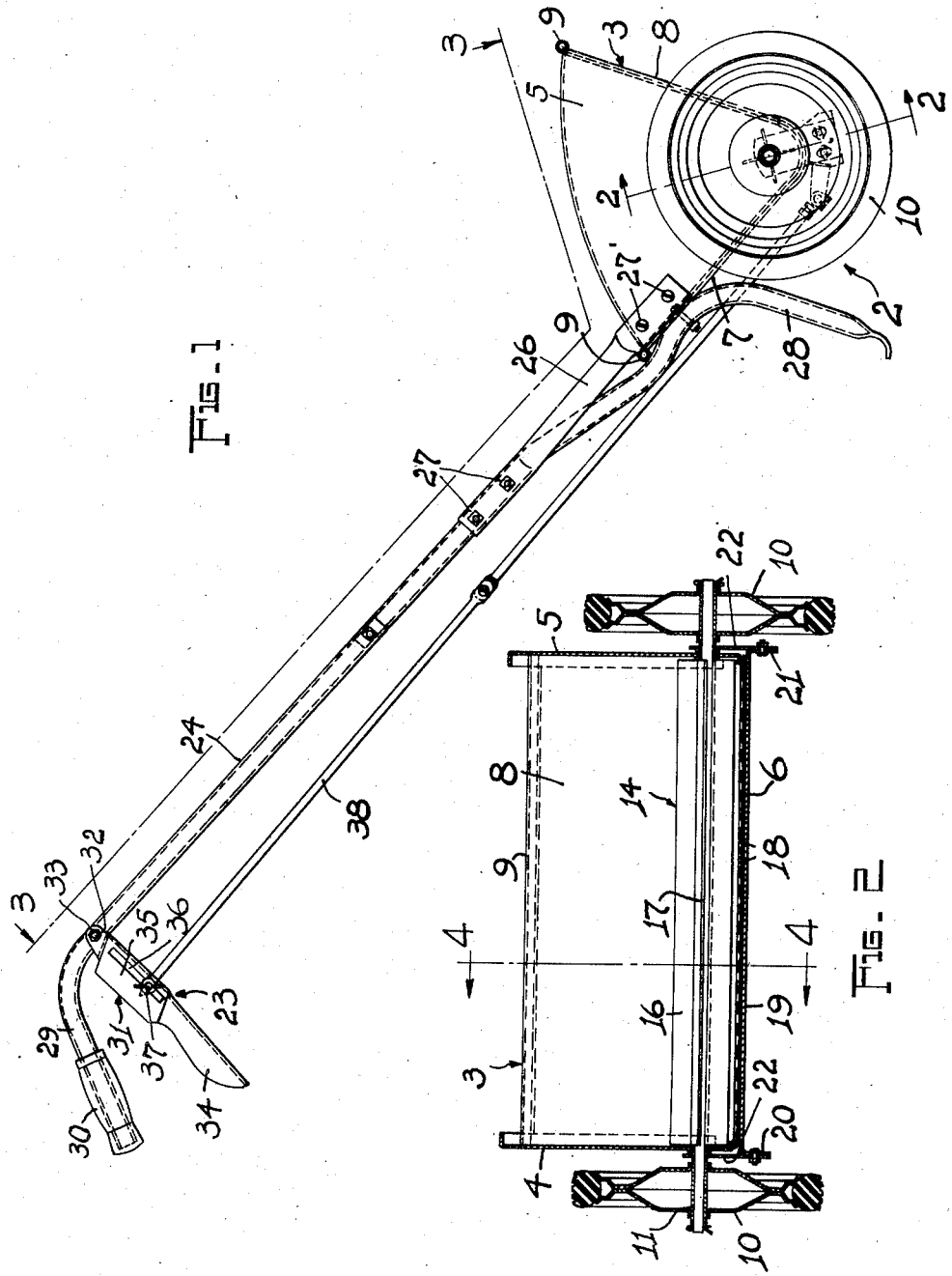
INVENTOR.
HARRY A. LILJENBERG
BY
ATT.

Dec. 24, 1957  H. A. LILJENBERG  2,817,457
SEED AND FERTILIZER SPREADER
Filed Jan. 3, 1956  2 Sheets-Sheet 2
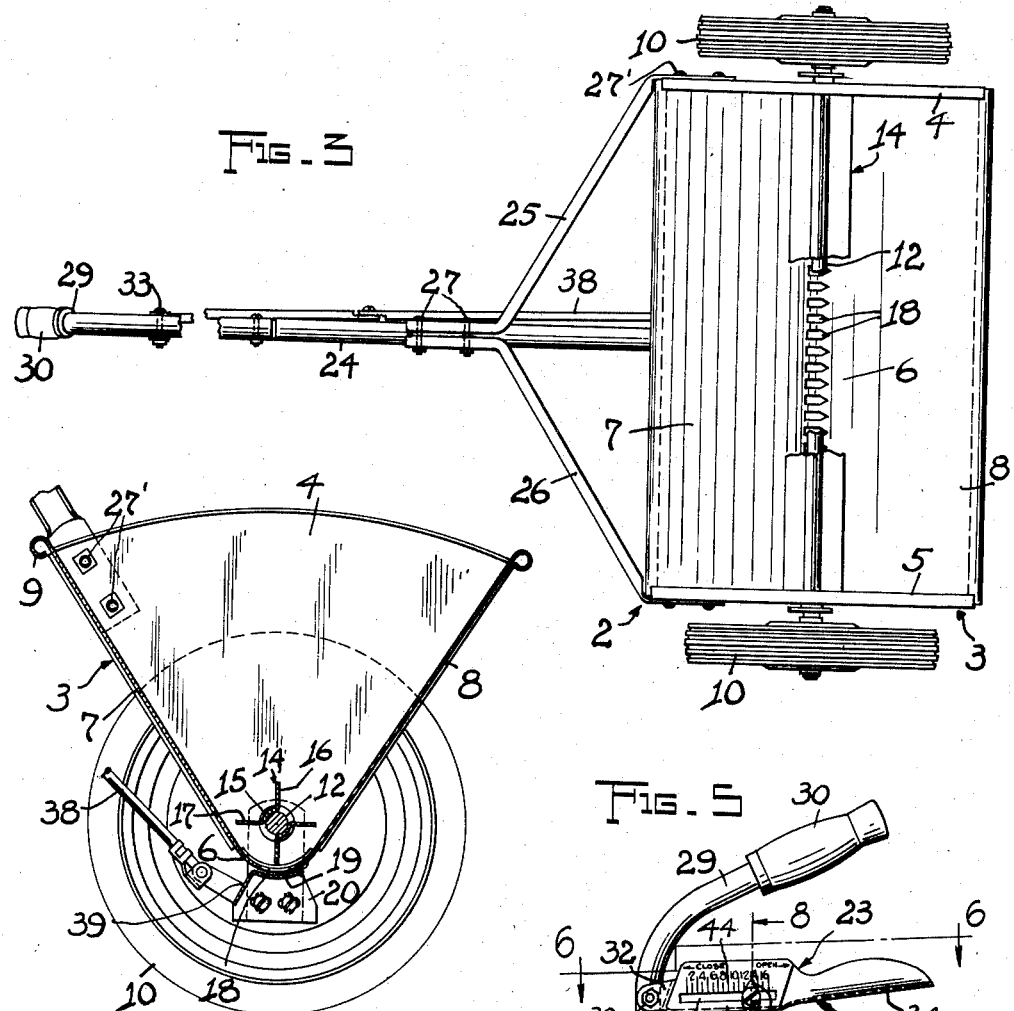
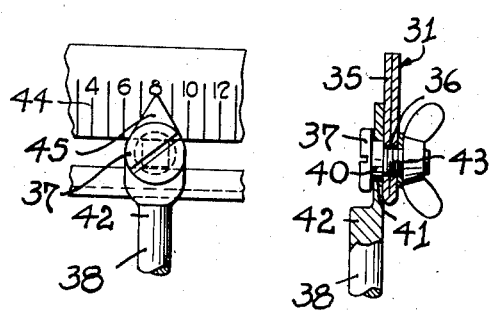
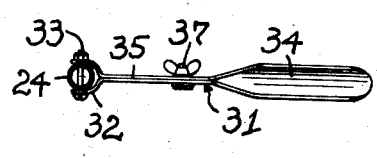
INVENTOR.
HARRY A. LILJENBERG
BY Gustav A. Wolff
ATT.

United States Patent Office 2,817,457
Patented Dec. 24, 1957

2,817,457

SEED AND FERTILIZER SPREADER

Harry A. Liljenberg, Cleveland, Ohio, assignor to Modern Tool & Die Company, Cleveland, Ohio, a corporation of Ohio Application January 3, 1956, Serial No. 557,122

4 Claims. (Cl. 222—42)

This invention relates to material spreading apparatus such as seed and fertilizer spreaders adapted to spread predetermined amounts of seed or fertilizer on lawns, gardens, etc., and has particular reference to actuating and adjusting mechanism for hand-operated spreaders.

Spreaders of this type discharge material from elongated, agitated hoppers having a series of relatively small discharge openings arranged in the bottom portions of the hoppers and controlling these openings by shiftable shutter means actuated by mechanism adapted to shift the shutter means within narrow limits from closing position to opening positions exposing the necessary material discharge area of the discharge openings for the desired amount of material to be spread.

The general object of this invention is the provision of a material spreading apparatus of the type referred to above with a simplified construction of shutter actuating mechanism, the shutter actuating mechanism consisting of hand-operated lever means pivoted to the handlebar of the spreader and linked to the shutter means for its differential shifting by the hand-operated lever.

Another object of the invention is the provision of a material spreading apparatus of the type referred to above with lever-controlled shutter actuating mechanism which embodies a hand-operated lever pivotally mounted on the handlebar of the spreader and provided with coupling means adjustably mounted on such lever to permit link means to be coupled with differentially spaced points of the hand-operated lever for the desired actuation of the shutter means effecting control of the discharge openings of the hopper of the spreading apparatus.

With the above and other objects in view, the invention has certain other marked superiorities which clearly distinguish it from presently known structures and arrangements of this type. These improvements or characteristics, embodying certain novel features of construction and design, are clearly set forth in the appended claims, and the preferred form of embodiment of the invention as used in a hand-operated spreader is hereinafter shown with reference to the accompanying drawings forming part of the specification.

In the drawings:

Fig. 1 is a side view of a hand-operated spreader embodying the invention;

Fig. 2 is an enlarged sectional view taken on line 2—2 of Fig. 1;

Fig. 3 is a plan view of the spreader shown in Fig. 1, the view being taken on line 3—3 of Fig. 1;

Fig. 4 is an enlarged cross sectional view taken on line 4—4 of Fig. 2;

Fig. 5 is an enlarged side view of the hand-operated lever means of the shutter actuating means;

Fig. 6 is a sectional view taken on line 6—6 of Fig. 5;

Fig. 7 is an enlarged plan view of the coupling and indicating arrangement of the hand-operated lever means; and Fig. 8 is a sectional view taken on line 8—8 of Fig. 5.

Referring now in detail to the exemplified form of the invention shown in the drawings, the hand-operated seeder and fertilizer 2 embodies an open top reservoir hopper 3 having laterally spaced upright end walls 4 and 5, a rounded bottom wall 6, and diverging front and rear walls 7 and 8 reenforced at their top edges by rounded flanges or beads 9. Hopper 3 is supported by carrying wheels 10 mounted on a tubular shaft 11 which is journaled in end walls 4 and 5 on an axis substantially coincident with that of the rounded bottom wall 6. Shaft 11 supports the carrying wheels 10 on outwardly extended end portions with at least one of the wheels rigidly coupled to one of the end portions.

Shaft 11 mounts on its central portion 12 a plurality of elongated, substantially V-shaped agitator blades 14 which are secured with their elongated, curved base portions 15 to said shaft in symmetrical relation with respect to each other to extend wing portions 16 and 17 of the agitator blades radially from shaft 11 at right angles to each other.

Hopper 3 includes on the medial line of its bottom wall 6 a series of elongated, at their one ends pointed, laterally spaced discharge openings 18 extended through said hopper from end to end parallel to its end walls 4 and 5 so that rotation of shaft 11 and agitator blades 14 and their wing portions effects shifting of material toward and through discharge openings 18.

Shaft 11 also mounts an elongated shutter bar 19 which is associated with the outside of rounded bottom wall 6 of hopper 3 and curved in accordance therewith. This shutter bar is preferably made of sheet metal and includes at its opposite ends ear portions 20, 21 adjustably securing shutter bar 19 to pivot brackets 22 pivotally supported by shaft 11. A shifting of the thus suspended shutter bar 19 is effected by a lever mechanism 23, later to be described.

Spreader 2 is pushed over the ground by a tubular handlebar 24 attached to hopper 3 by diverging side bars 25, 26 which have their one ends attached to handlebar 24 by bolts 27 and their other ends secured to hopper end walls 4 and 5 by bolts 27'. Tubular handlebar 24 includes at its lower end a supporting leg portion 28 to support the spreader when not in use and has its upper end bent to provide a handgrip portion 29 mounting a handle member 30. Furthermore, tubular handlebar 24 supports on its upper end, just below handgrip portion 29, a lever 31 of lever actuating mechanism 23, which lever includes at one end a fork-shaped end section 32 pivoted to handlebar 24 by bolt 33, a handle section 34, and a longitudinally slotted coupling section 35 positioned between sections 32 and 34.

Lever 31 adjustably supports in an elongated slot 36 of coupling section 35 a pivot bolt 37 which is linked by link member 38 to struck-up ear lug 39 of shutter bar 19. This pivot bolt includes a cylindrical portion 40 seated in a bore 41 of upper end portion 42 of link member 38 and a treaded portion 43 extended through slot 36 of coupling section 35 to permit rigid clamping of pivot bolt 37 in desired adjusted position to lever 31, a position ascertainable by scale 44 cooperating with pointed end 45 of upper end portion 42 of link member 38.

In operation, upward shifting of actuating hand lever 31 toward handgrip 29 effects opening up of discharge openings 18, and shifting of hand lever 31 in an opposite direction effects closing of discharge openings 18. The ratio of opening these discharge openings is controlled by shifting of shutter bar 19 caused by longitudinal movements of link member 38, movements which depend on the adjusted position of coupling pivot bolt 37 in slot 36 of lever 31.

Having thus described my invention,
What I claim is:

1. In a material spreader having a handlebar mounting a hopper with discharge openings and shiftable shutter means controlling the discharge openings, shifting mechanism for said shutter means including a longitudinally slotted shifting lever pivoted to the handlebar, link means connecting said shifting lever with said shutter means, and coupling means extended through the elongated slot and pivotally connecting said shifting lever with said link means, said coupling means being adjustably slidably mounted in the elongated slot of said shifting lever to control the stroke of the link means and the shutter means by the position of the coupling means in the elongated slot of the shifting lever.

2. A material spreader as described in claim 1, wherein an edge of the slot in the shifting lever is graduated, wherein the coupling means is extended through the slot and includes means adapted to rigidly clamp the coupling means in adjusted position to the shifting lever.

3. A material spreader as described in claim 1, wherein an edge of the slot in the shifting lever is graduated, wherein the coupling means consists of a bolt and nut member extended through the slot and clamped in adjusted position to the shifting lever, and wherein said bolt and nut member includes a cylindrical portion extended through link member and pivotally securing same to said bolt and nut member.

4. A material spreader as described in claim 1, wherein an edge of the slot in the shifting lever is graduated, wherein the coupling means consists of a bolt and nut member extended through the slot and clamped in adjusted position to the shifting lever, wherein the bolt and nut member includes a cylindrical portion pivotally securing one end of the link member to said bolt and nut member, and wherein the link member has said one end formed to a pointed extension adapted to indicate on the graduations the position of the coupling means on the shifting lever.

References Cited in the file of this patent

UNITED STATES PATENTS

| | | |
|---|---|---|
| 2,073,170 | Pieper | Mar. 9, 1937 |
| 2,200,773 | Finne | Mar. 14, 1940 |
| 2,718,986 | Peoples | Sept. 27, 1955 |
| 2,767,887 | Bond et al. | Oct. 23, 1956 |